United States Patent [19]

Ware

[11] Patent Number: 4,595,216
[45] Date of Patent: Jun. 17, 1986

[54] VEHICLE SUSPENSION STRUCTURE

[75] Inventor: Nathan C. Ware, North Muskegon, Mich.

[73] Assignee: Lear Siegler, Inc., Santa Monica, Calif.

[21] Appl. No.: 632,721

[22] Filed: Jul. 20, 1984

[51] Int. Cl.[4] .......................... B60G 9/02; B60G 11/28
[52] U.S. Cl. ..................................... 280/661; 280/678; 280/673; 280/713; 267/36 A
[58] Field of Search ............... 280/672, 673, 660, 666, 280/663, 667, 713, 661, 678; 267/36 A

[56] References Cited

U.S. PATENT DOCUMENTS

| Re. 30,308 | 6/1980 | Masser | 280/713 |
|---|---|---|---|
| 2,065,071 | 12/1936 | Harris | 280/661 |
| 2,162,828 | 6/1939 | Slack | 280/661 |
| 2,674,465 | 4/1954 | Carpezzi | 280/661 |
| 2,846,250 | 8/1958 | Davis | 403/108 |
| 3,163,441 | 12/1964 | Traugott | 280/661 |
| 3,229,959 | 1/1966 | Smothers | 254/100 |
| 4,202,564 | 5/1980 | Strader | 280/678 |

Primary Examiner—Richard A. Bertsch
Attorney, Agent, or Firm—Varnum, Riddering, Schmidt & Howlett

[57] ABSTRACT

A vehicle suspension element adjustment apparatus including improved structure for adjusting suspension elements to any of a plurality of discrete positions for alignment thereof wherein pairs of relatively adjustable elements are connected to respective pairs of plate members having formed surfaces for mutual interengagement of the pairs of plates in any of such discrete positions of adjustment. The formed surfaces preferably are vertically oriented serrations which permit relative horizontal adjustment between the pairs of plates, and hence between the suspension elements connected thereto.

20 Claims, 8 Drawing Figures

VEHICLE SUSPENSION STRUCTURE

BACKGROUND OF THE INVENTION

Proper axle alignment in road vehicles is important to prevent undue tire wear. Some common causes of improper wheel alignment in road vehicles include improper initial suspension system installation, accident damage and impact or shock loads imposed on suspension components by potholes and other road irregularities.

Various wheel alignment adjustment systems have been provided to permit adjustment of vehicle axles and wheels to proper alignment. For example, U.S. Pat. No. 2,674,465 issued Apr. 6, 1954, discloses an alignment device for automobile wheels wherein complementary notched plates are adjustable with respect to each other to adjust the camber axis of the vehicle axle.

U.S. Pat. No. 2,065,071 issued Dec. 22, 1936, discloses another device for adjusting the camber axis of a vehicle wheel including an eccentric bushing which is mounted within a cylindrical bushing for rotation with respect thereto. The cylindrical bushing has an outer serrated surface which mates with a serrated lock washer on a bolt that is tightened down to secure the lock washer with respect to the cylindrical bushing and thereby fix the relative rotary positions of the eccentric and cylindrical bushings.

U.S. Pat. No. 2,162,828 issued June 20, 1939, discloses a suspension system for camber adjustment between a steering knuckle support pin and attached links or arms. Serrations on each end of the support pin mate with complementary serrations on the ends of the attached arms to lock the support pin in position with respect thereto. The arms have elongated slots in which securing pins are mounted such that adjustment of the securing pins in the elongated slots will serve to adjust the camber axis of the vehicle axle.

U.S. Pat. No. 3,163,441 issued Dec. 29, 1964, discloses another device for adjusting the camber axis of a vehicle axle in which an eccentric bushing is maintained in position by a serrated washer which bites into adjacent surfaces and further by a lock washer and associated pressure plate which have complementary serrated surfaces.

U.S. Pat. No. 4,202,564 issued May 13, 1980, discloses a bushing which has serrated surfaces that mate with complementary serrated surfaces in mounting blocks to maintain a selected position of the bushing with respect to a surrounding sleeve.

U.S. Pat. No. 3,229,959 issued Jan. 18, 1966, discloses a caster and camber adjustment mechanism for a vehicle axle in which a mounting block has serrated surfaces which engage complementary serrated surfaces on a frame. The camber and caster angles are adjusted by releasing a clamp device and rotating the mounting block with respect to the frame.

U.S. Pat. No. 2,846,250 issued Aug. 5, 1958, discloses the adjustment of struts in a jet engine by an alignment block having an elongated opening and serrated surfaces on both sides thereof to mate with complementary serrated surfaces on a strut and on the frame to which the strut is secured. Once the proper alignment is achieved a permanent locking pin is installed to ensure permanent maintenance of the aligned position.

U.S. Pat. No. Re 30,308 originally issued Dec. 9, 1969, discloses a vehicle suspension including vertically swingable control arms wherein the pivot connections between the control arms and the vehicle frame, or between the control arms and the axle, include a pair of alignment plates carried by the pivot pin closely adjacent to respective opposite sides of the vehicle bracket to which the control arm is pivotally connected. The installed pivot pin assembly is movable laterally with respect to the vehicle frame, but is laterally fixed with respect to the alignment plates. Alignment may be achieved upon initial control arm installation by clamping the pivot pin assembly (i.e. as by tightening down a pivot bolt) in properly aligned orientation and then welding the alignment plates to the frame.

BRIEF SUMMARY OF THE INVENTION

The present invention contemplates an improved selectively adjustable vehicle suspension alignment structure which is adapted to be incorporated in a pivotal suspension element such as a trailing arm, link or beam, or in nonpivoting suspension elements. In one presently preferred embodiment of the invention pairs of alignment plates are provided with mutually complementary serrations which permit the suspension elements associated therewith to be adjusted laterally of the pivot axis or connection pin therefor. Pairs of the alignment plates are also provided with or have associated therewith mutually interengageable supporting means for support of the plates with respect to one another in at least one direction transverse to the direction of relative movement therebetween during alignment adjustments.

The invention thus provides for improved structural strength and ease of assembly and adjustment in vehicle suspension system to permit ready adjustment of the suspension elements in opposite lateral directions while providing for support of the adjustment elements in at least one direction transverse to the direction of adjustment.

The invention will be more fully appreciated upon consideration of the following description and the accompanying drawings, in which.

Figure 1:
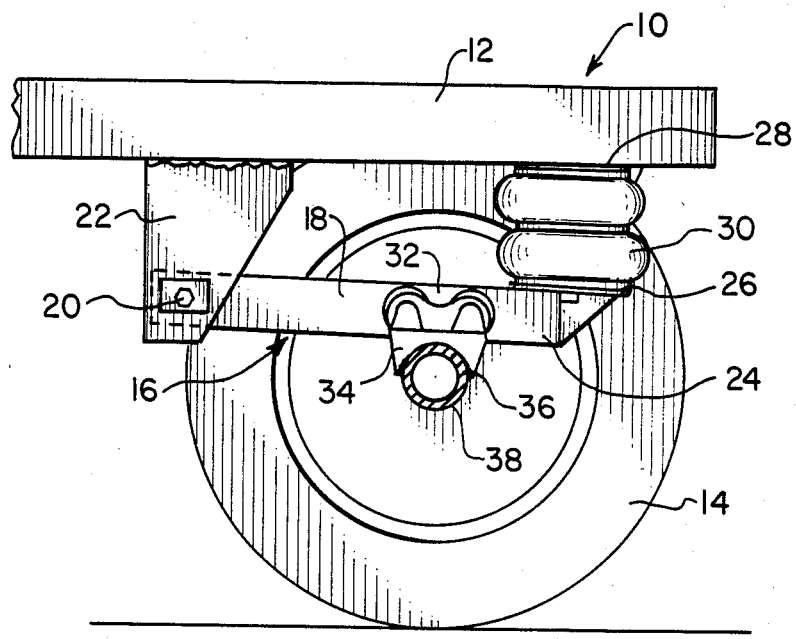
FIG. 1 is a fragmentary side elevation of a vehicle suspension including adjustable alignment means of the present invention.

Represented in FIG. 1 is a truck trailer or other vehicle 10 having a frame 12 from which a pair of ground-engaging wheels 14 mounted on an axle 38 are suspended by a suspension 16 according to one preferred emobodiment of the invention. In general, the suspension 16 includes at each side of the vehicle 10 a trailing control arm 18 pivotally connected at 20 to a bracket 22 affixed to frame 12. The control arms 18 swing vertically about their pivotal connections 20 which are substantially coaxial. Each control arm 18 has a free end portion 24 with a pedestal 26 thereon. Frame 12 is provided with a pedestal 28 spaced upwardly of pedestal 26, and an air spring 30 is disposed in load-transmitting relation between the pedestals 26, 28. Control arms 18 are connected at 32 to brackets 34 which are anchored as by weldments 36 to axle 38.

Figure 2:
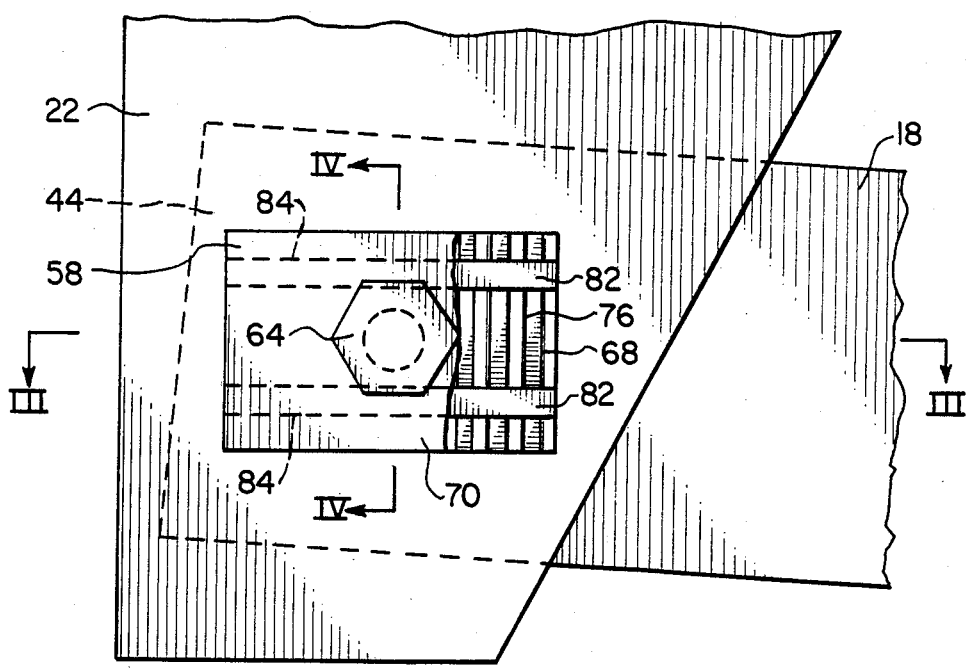
FIG. 2 is an enlarged fragmentary portion of FIG. 1.
Figure 3:
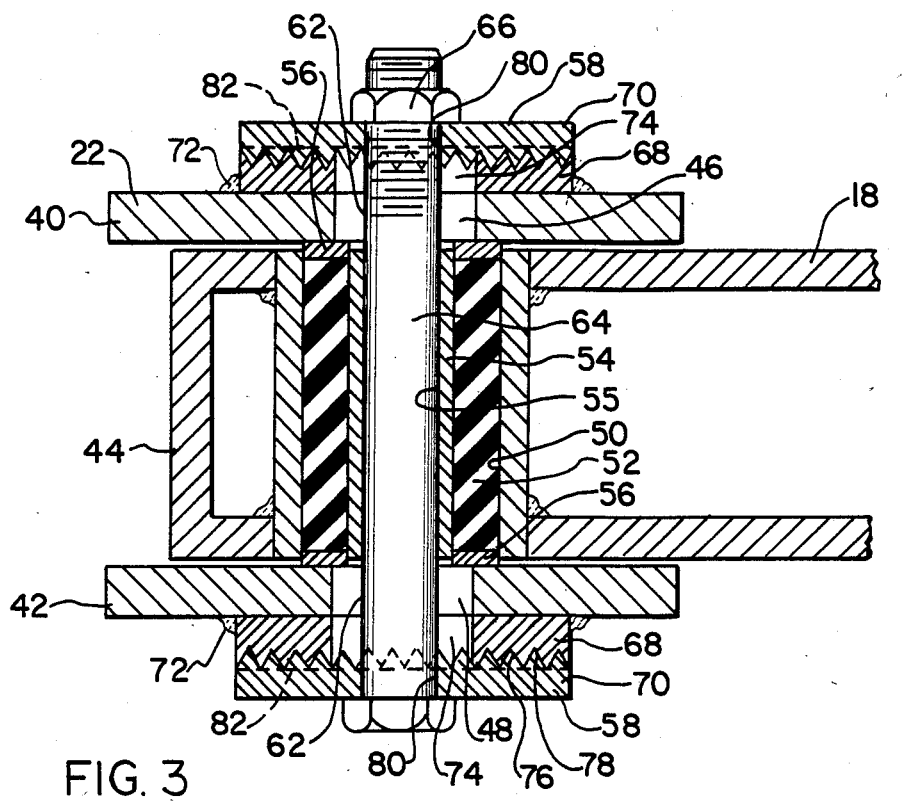
FIG. 3 is a section taken on line III—III of FIG. 2.

Referring to FIGS. 2 and 3, each bracket 22 has two laterally spaced sides 40, 42 between which the pivoted end portion 44 of one control arm 18 is disposed. Bracket sides 40, 42 are provided with aligned openings 46, 48, respectively, which are elongated in a direction generally longitudinal of the control arm 18. The pivoted end portion of the control arm 18 has an opening 50 within which is press fitted a torsion bushing 52 of elastomeric material such as rubber. The inner surface of bushing 52 is bonded to a metal sleeve 54 having a throughbore 55 which for assembly is axially aligned with bracket openings 46, 48. Washers 56 are disposed between the inner faces of bracket sides 40, 42 and end portion 44 of the control arm in alignment with openings 46, 48 and 55. A pair of alignment assemblies 58 are engaged against the outer faces of bracket sides 40, 42, and each includes a central opening 62 therethrough which is aligned with opening 46 or 48, respectively.

A pin in the form of a bolt 64 is passed through openings 62, bracket openings 46, 48, washers 56, and opening 55 in sleeve 54 to pivotally connect control arm end portion 44 to bracket 22, and a nut 66 is threaded onto bolt 64.

Each alignment assembly 58 includes a pair of plate members 68, 70. The plates 68 are rigidly and fixedly secured to the respective outer surfaces of bracket sides 40, 42 as by weldments 72 with enlarged portions 74 of the through openings 62 in the plates 68 located in registry with openings 46, 48 in the respective bracket sides 40, 42. Each plate 68 presents an outwardly facing surface having thereon formed means such as a plurality of vertically extending, generally V-shaped serrations 76 which are cooperably engageable in a plurality of laterally shifted positions with complementary serrations 78 formed on the respective mating plates 70.

A portion 80 of through opening 62 extending within each plate 70 is of cross sectional shape and dimension to closely receive therein the bolt 64 whereby upon loosening of nut 66 on bolt 64 the arm 18, bolt 64 and plates 70 may be adjusted laterally to any of a plurality of mutually distinct alignment positions within the lateral range of movement of bolt 64 within openings 46, 48. The portion 80 is shown centrally located with respect to plate member 70 but this portion may be offset to either side of the plate as desired. Each such position is defined by the complementary inter-engagement of serrations 76, 78, and each is attained by loosening nut 66 sufficiently to permit the respective complementary serrations 76, 78 to override each other during lateral adjustment of plates 70 with respect to plates 68. Accordingly, the member pinned by bolt 64 (arm 18 in this case) may be shifted laterally along a predetermined line with respect to the member to which it is connected, and secured in such shifted position for vehicle suspension alignment purposes.

The respective pairs of alignment plates 68, 70 are vertically supported with respect to one another by interengaging support means which constrains the respective pairs of plates 68, 70 against relative motion in the direction transverse to the direction of alignment adjustment. For example, in the embodiment of the invention shown in FIGS. 2, 3 and 4, the plate 68 is provided with a pair of spaced apart, longitudinally extending tongue portions 82 which project outwardly to engage a complementary pair of grooves 84 formed in the mating plate 70. Accordingly, when the plates 68, 70 are interengaged in any adjustment position thereof the engaged tongues and grooves 82, 84 support the plates 68, 70 vertically, or more generally, constrain the plates 68, 70 against relative movement in the direction transverse to the direction of adjustment.

This support is independent of bolt 64 and reduces wear by the bolt on the elongated openings 46 and 48. Further the support afforded by the described tongue and groove structure improves the ease and convenience of suspension assembly during initial installation and of subsequent repairs or maintenance, and simplifies vehicle wheel alignment procedures.

Figure 4:
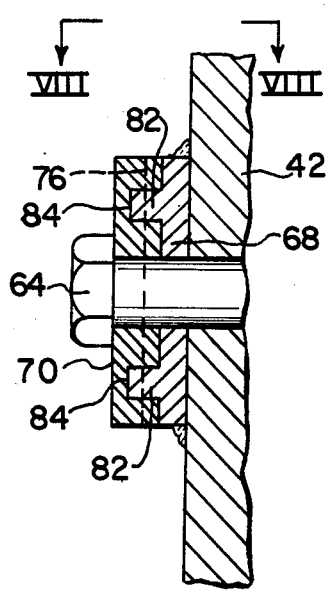
FIG. 4 is a section taken on line IV—IV of FIG. 2.
Figure 5:
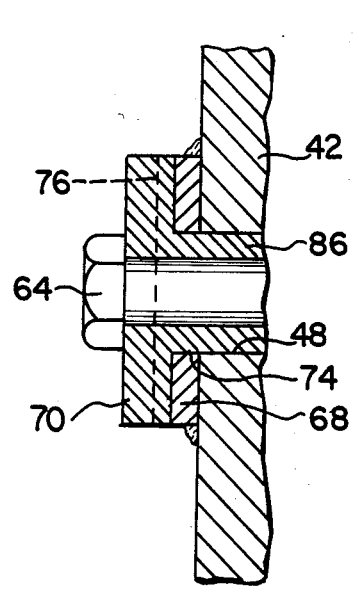
FIG. 5 is a section view similar to FIG. 4 showing one alternative embodiment of the invention.

Other embodiments of the invention are contemplated. For example, referring to FIG. 5, in lieu of the tongue and groove structure of FIG. 4 the plate member 70 may include an elongated annular flange 86 which extends coaxially with respect to opening portion 80 such that in the assembled configuration flange 86 encompasses bolt 64 and extends axially through opening portion 74 and through the respective opening 46 or 48. This structure, like that of FIG. 4, provides support of the interengaged plates 68, 70 with respect to one another in the direction transverse to the direction of lateral adjustment. Of course it will be understood that in the FIG. 5 embodiment the opening 48 and opening portion 74 are not only elongated in the direction of lateral adjustment to permit a range of movement for bolt 64 therewithin, but additionally are vertically enlarged sufficiently to receive the flange portion 86. The flange position 86 can be rectangular or square or annular in cross section and the opening 48 can be shaped to accommodate the shape of the flange 86. Thus, the opening 48 can be an elongated rectangular shape if the flange 86 is square or rectangular in configuration. A rectangular or square shape flange 86 would provide a greater bearing area for the plate member 70 and would therefore reduce wear on the elongated opening 48.

Figure 6:
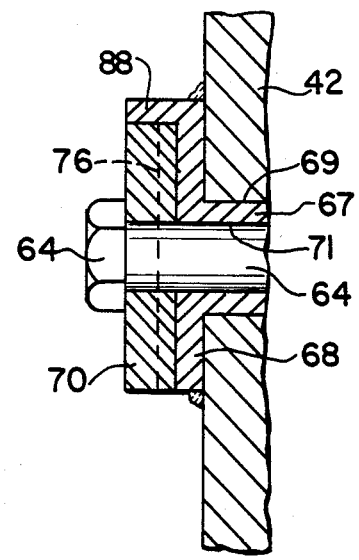
FIG. 6 is a section view similar to FIGS. 4 and 5 showing another alternative embodiment.

In yet another embodiment of the invention as shown in FIG. 6, the plate member 68 includes an elongated upper flange portion 88 which projects laterally outward therefrom to provide a bearing surface for support of the mating plate 70. The plate 70 is thus constrained against vertically upward movement transversely of the direction of adjustment with respect to mating plate 68 to provide the requisite support of the engaged plates independently of bolt 64. The flange portion 88 may be integral with plate 68 or may be fixedly secured adjacent the top of plate 68 as by welding or any other suitable means. An additional structural improvement illustrated in FIG. 6 is an annular, axially extending flange 67 which is integral with plate 68 and extends axially within an enlarged opening 69 within bracket 42. The flange 67 is of course elongated in the horizontal direction to provide a horizontally elongated opening 71 therethrough to receive bolt 64 and for horizontal adjustability of bolt 64 therein.

In each of the described embodiments, it is preferred that the support means (e.g. tongue and groove structure 82, 84) remain engaged when the complementary serrations 76, 78 are disengaged for adjustment. Thus, in each of the embodiments shown the bolt 64 may be loosened sufficiently to permit the respective complementary serrations to override each other during adjustment while at the same time maintaining the respective vertical support structures in supporting interengagement. For each embodiment this engagement requires that the depth of interengagement of the support structure (i.e. the flange portions 88, the flange 86, or the tongue and groove 82, 84) be greater than the depth of engagement of serrations 76, 78.

The mode of manufacture of plates 68, 70 may be selected according to the design requirements. For example, the plates 68, 70 may be cast, sintered from powdered metal, or machined from plate steel.

Figure 7:
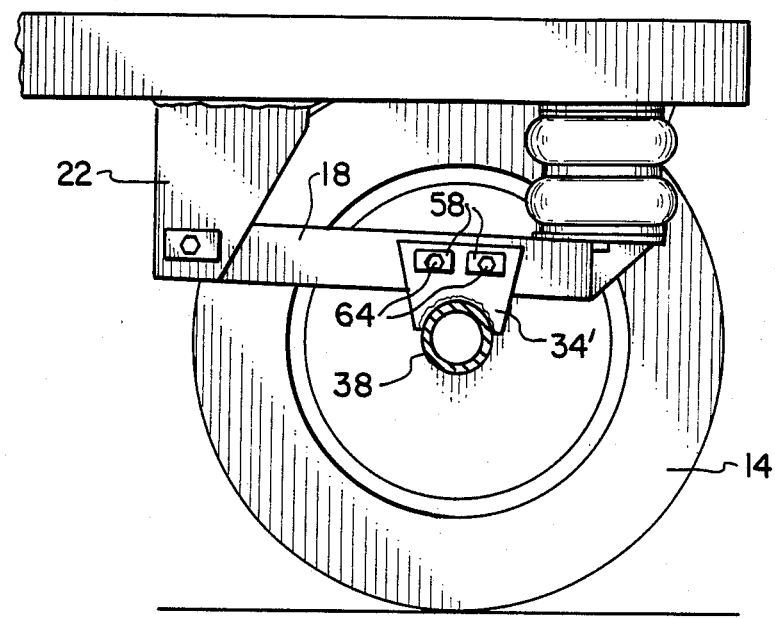
FIG. 7 is a side elevation similar to FIG. 1 showing another alternative embodiment of the invention.

It will be appreciated that the invention as above described may be employed in either pivotal or nonpivotal connections and in various configurations of adjustable suspension elements. For example, in FIG. 7 there is shown an alternative embodiment of the invention wherein the arm 18 is rigidly connected to axle assembly 38 by means of the invention hereinabove described. Accordingly an axle bracket 34' has a pair of upwardly projecting, transversely spaced apart side members similar to the side members 40, 42 of the frame bracket 22 above described. Alignment assemblies 58 include serrated plates which are affixed to the outer surfaces of the axle bracket side members and mating plates which are provided for adjustable securing of the axle bracket 34' with respect to arm 18 in the same manner as above described. As shown, the axle bracket 34' is secured to arm 18 by a pair of adjustable assemblies 58, each similar in all salient respects to any of the above described embodiments of the invention. By use of a pair of bolts 64 to secure the axle assembly the connection thereof to arm 18 is rendered rigidly non-pivotable.

Figure 8:
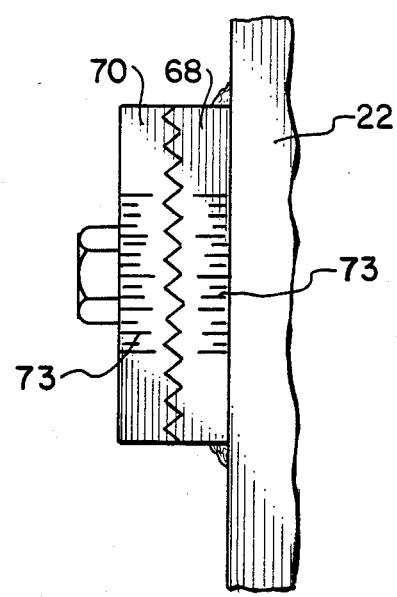
FIG. 8 is a fragmentary top plan view taken on line VIII—VIII of FIG. 4.

Any of the hereinabove described embodiments of the invention may include an additional feature in the nature of registerable indicia on the mating pairs of plates to provide a gauge of the magnitude of any adjustment made according to the above description. For example, in FIG. 8 there is shown a pair of the mating plates 68, 70 having indicia means in the form of hash marks 73 which may be scribed in the upper surfaces of the plates 68, 70. The hash marks may represent any suitable unit of linear measure, inches and fractions thereof for example, whereby upon adjustment of the connection the magnitude of adjustment may be readily controlled without resort to other measuring devices.

According to the description hereinabove there is provided novel vehicle suspension alignment apparatus including mating plates which are relatively adjustable in a lateral direction to any of a plurality of distinct adjustment positions, which positions are maintained by mechanical interengagement of complementary serrations or other interengageable structure. The invention provides for support of the mating plates in a lateral direction transverse to the direction of adjustment not only when the plates are tightly clamped in such mechanical interengagement, but also when they are unclamped or free from mechanical interengagement by a predetermined amount for adjustment of the suspension. The inventions provide for secure, controlled adjustment without the necessity of welding.

It will be appreciated that the several alternative embodiments disclosed herein are not intended to limit the scope of the invention as the inventor has contemplated other alternative embodiments as well. For example, the disclosed serrations may be substituted by any suitable structure permitting mutual interengagement of the plates at a plurality of laterally displaced or shifted positions; guide marks such as index lines may be scribed upon the tops of the plates 68, 70 as a guide for alignment and adjustment of the vehicle suspension; other embodiments of the disclosed vertical support structure are comtemplated; the location of the alignment apparatus of this invention may be at the axle-to-trailing arm connection point; and the like.

These and other embodiments and modifications having been envisioned and anticipated by the inventor, it is intended that the invention be construed as broadly as permitted by the scope of the claims appended hereto.

The embodiments of the invention in which an exclusive property or priviledge is claimed are defined as follows:

1. In a vehicle having a frame with ground-engaging wheels suspended therefrom by a trailing-arm suspension means, wherein two trailing arms are pivotably connected to opposite lateral sides of the frame for substantially coaxial swinging in a vertical direction, a wheel-carrying axle has connections with the trailing arm and spring means are provided in load-transmitting relationship between the frame and the trailing arms, at least one of the connections includes a means for adjusting the relative position of the axle with respect to the frame, the improvement in said adjusting means comprising:

first and second plate means movable with respect to each other and including mutually complementary formed surface portions cooperable for mechanical interengagement of said first and second plate means in a plurality of mutually distinct, laterally spaced-apart positions and for constraining relative movement between said first and second plate means in a first lateral direction;

bearing means to constrain relative movement between said first and second plate means in a plurality of laterally adjustable positions in a second lateral direction transverse to said first lateral direction; and means to releasably maintain said first and second plates in firm contact with each other at said mutually complementary formed surface portions to maintain said first and second plate means in aligned position.

2. The invention of claim 1 wherein said means for releasably maintaining said first and second plate means in firm contact with each other comprises a bolt which extends through aligned apertures in said first and second plate means.

3. The invention of claim 1 wherein said first and second plate means have marking indicia on upper surfaces thereof for visually indicating the relative lateral relationship between said first and second plate means along said first direction.

4. The invention of claim 1 wherein said formed surface portions include complementary pluralities of elongated, vertical serrations formed on surface portions of the first and second plate means.

5. The invention of claim 4 wherein said bearing means comprises a tongue-and-groove structure which extends in the first lateral direction.

6. The invention of claim 4 wherein said first plate means has an elongated slot extending in said first direction; and wherein said bearing means comprises a shoulder on said second plate means extending into said first plate means elongated slot.

7. The invention of claim 4 wherein said shoulder is annular in shape and said at least one connection comprises a pin means which extends through said annular shoulder and through said elongated slot.

8. The invention of claim 6 wherein said shoulder is rectangular in cross-section, said elongated slot is rectangular and said at least one connection comprises a pin means which extends through said shoulder and through said elongated slot.

9. The invention of claim 4 wherein said bearing means comprises a flange which extends from said first plate means over an upper surface of said second plate means and in bearing engagement therewith.

10. The invention of claim 4 wherein said at at least one connection comprises said pivotable connection between said frame and said trailing arm, and said first plate means is fixed to said frame and said second plate means is connected to said trailing arm through said means to releasably maintain said first and second plate means in firm contact with each other.

11. The invention of claim 8 wherein said frame has an elongated aperture extending in the first direction and said first plate means has a shoulder of a dimension shaped to closely fit within said elongated opening to rigidly hold said first plate means to said frame.

12. The invention of claim 4 wherein said at least one connection comprises said connection between said trailing arm and said axle, and said first plate means is connected to said trailing arm and said second plate means is connected to said axle.

13. The invention of claim 12 wherein said means to releasably maintain said first and second plate means in firm contact with each other comprises a bolt which extends through aligned apertures in said first and second plate means.

14. The invention of claim 12 wherein said bearing means comprises a flange on said frame in bearing relationship to an upper surface of said second plate means.

15. In a vehicle having a suspension system adapted to support the vehicle with respect to ground engaging means and wherein the vehicle includes a bracket portion to which a member of the suspension system is adapted to be secured, a selectively adjustable securing apparatus for adjustably securing the suspension member with respect to the bracket portion comprising:

first engagement means fixedly secured with respect the bracket portion;

said first engagement means including thereon first formed means;

second engagement means moveably disposed with respect to the bracket portion;

said second engagement means including thereon second formed means which are cooperable with said first formed means for complementary mechanical interengagement between said first and second engagement means when said first and second engagement means are in confronting relationship to permit selective adjustable positioning of said second engagement means with respect to said first engagement means in any of a plurality of positions spaced apart in a predetermined lateral direction and said first and second formed means having means to preclude lateral movement of said second engagement means with respect to said first engagement means in a lateral direction transverse to said predetermined direction; and retention means adapted to releasably secure the suspension member to the bracket portion and cooperable with said first and second engagement means to selectively maintain said complementary mechanical interengagement therebetween in any of said plurality of positions, said retention means being constrained to move with said second engagement means during positioning thereof in any of said plurality of positions whereby the suspension member which is engaged by said retention means is securable with respect to the bracket portion in a selected position by securing said first and second engagement means with said retention means in said complementary mechanical interengagement at a corresponding one of said plurality of positions.

16. The apparatus as claimed in claim 15 wherein said first engagement means is a pair of plate means fixedly secured at spaced locations to the vehicle bracket portion.

17. The apparatus as claimed in claim 16 wherein said second engagement means is a second pair of plate means in registry with said first pair of plate means.

18. The apparatus as claimed in claim 17 wherein said first and second formed means include complementary pluralities of elongated, vertical serrations formed on surface portions of the first and second plate means.

19. The apparatus as claimed in claim 18 wherein said retention means includes elongated means engageable with said first and second plate means and including an intermediate portion thereof extending between said spaced locations in which said suspension member is received.

20. The apparatus as claimed in claim 19 wherein said first and second formed means additionally include support means on the said first and second plate means which are mutually interengageable for constraining each said second plate means against movement with respect to said first plate means in the direction of the extent of said elongated serrations.

* * * * *

UNITED STATES PATENT AND TRADEMARK OFFICE
CERTIFICATE OF CORRECTION

PATENT NO. : 4,595,216
DATED : June 17, 1986
INVENTOR(S) : NATHAN C. WARE

It is certified that error appears in the above–identified patent and that said Letters Patent are hereby corrected as shown below:

In claim 7, line 1, "4" should be --6--

In claim 11, line 1 "8" should be --10--

Signed and Sealed this

Fourteenth Day of April, 1987

Attest:

DONALD J. QUIGG

*Attesting Officer*  *Commissioner of Patents and Trademarks*